United States Patent
Savla et al.

(10) Patent No.: US 9,866,436 B2
(45) Date of Patent: Jan. 9, 2018

(54) SMART MIGRATION OF MONITORING CONSTRUCTS AND DATA

(71) Applicant: Brocade Communications Systems, Inc., San Jose, CA (US)

(72) Inventors: Samir Savla, San Jose, CA (US); Prakash Kaligotla, Milpitas, CA (US); Naveen Kondapalli, San Ramon, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 135 days.

(21) Appl. No.: 14/557,216

(22) Filed: Dec. 1, 2014

(65) Prior Publication Data

US 2016/0156539 A1    Jun. 2, 2016

(51) Int. Cl.
*H04L 12/50* (2006.01)
*H04L 12/24* (2006.01)
*G06F 9/455* (2006.01)

(52) U.S. Cl.
CPC ...... *H04L 41/0816* (2013.01); *G06F 9/45558* (2013.01); *G06F 2009/4557* (2013.01); *G06F 2009/45591* (2013.01); *G06F 2009/45595* (2013.01)

(58) Field of Classification Search
CPC ............... H04L 1/1861; G06F 9/45558; G06F 9/45533; G06F 2009/45595
See application file for complete search history.

(56) References Cited

U.S. PATENT DOCUMENTS

| | | | |
|---|---|---|---|
| 8,510,815 B2* | 8/2013 | Sekiguchi | H04L 63/102 370/357 |
| 2009/0025007 A1* | 1/2009 | Hara | G06F 3/0607 718/105 |
| 2015/0281347 A1* | 10/2015 | Wang | G06F 9/5027 709/203 |

* cited by examiner

*Primary Examiner* — Marsha D. Banks Harold
*Assistant Examiner* — Elton Williams
(74) *Attorney, Agent, or Firm* — Blank Rome, LLP

(57) ABSTRACT

A system and method is disclosed for seamless network management monitoring when a device or Virtual Machine migrates. As part of a network management monitoring system and method, a separate distinct identifier is designated to each port and each device or VM being monitored. When a device is located a specific port a correlation between the distinct identifier of that port and the distinct identifier of the device is stored in a correlation table and monitored. Once this correlation changes, the network management monitoring system recognizes a migration has occurred and updates the correlation table to correlate the new port's distinct identifier with the device's distinct identifier. Parameters that were set up to be monitored for the device can then continue to be monitored at the new location.

20 Claims, 8 Drawing Sheets

SMART MIGRATION OF MONITORING CONSTRUCTS AND DATA

BACKGROUND OF THE INVENTION

1. Field of the Invention

The invention relates to network device management and more particularly to smart migration of monitoring parameters for performance network device management.

2. Description of the Related Art

Network management software provides network administrators a way of tracking the bandwidth and memory utilization of ports on a network. In general, network administrators choose the parameters that are desired to be monitored and set up specific flows to ensure those parameters are monitored and statistics about them are displayed. Generally, the parameters are selected for each port and as such the flow of parameters is tied to a switch port.

Most large networks and data centers include servers executing a series of virtual machines (VMs) where each virtual machine acts as a single purpose server. This virtual machine model allows much better use of the server hardware resources than a single use server model. The virtual machines may be managed using a virtual machine manager and monitored by the network management software. One side of effect of having a series of VMs is that the VMs may need to be moved or migrated from a current location to other locations. When a migration occurs, the parameters set up to be monitored for the particular VM or device may no longer be accessible to be monitored. Thus, new flows may need to be designated and set up by the network administrator each time a VM migrates. This is time consuming and inefficient. Therefore a method and system to improve the monitoring of VM parameters is desired that takes into account the possibility of migration.

SUMMARY OF THE INVENTION

A system and method is disclosed for seamless network management monitoring when a device or Virtual Machine migrates. As part of a network management monitoring system and method, a separate distinct identifier is designated to each port and each device or VM being monitored. When a device is located at a specific port a correlation between the distinct identifier of that port and the distinct identifier of the device is stored in a correlation table and monitored. Once this correlation changes, the network management monitoring system recognizes a migration has occurred and updates the correlation table to correlate the new port's distinct identifier with the device's distinct identifier. Parameters that were set up to be monitored for the device can then continue to be monitored at the new location.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
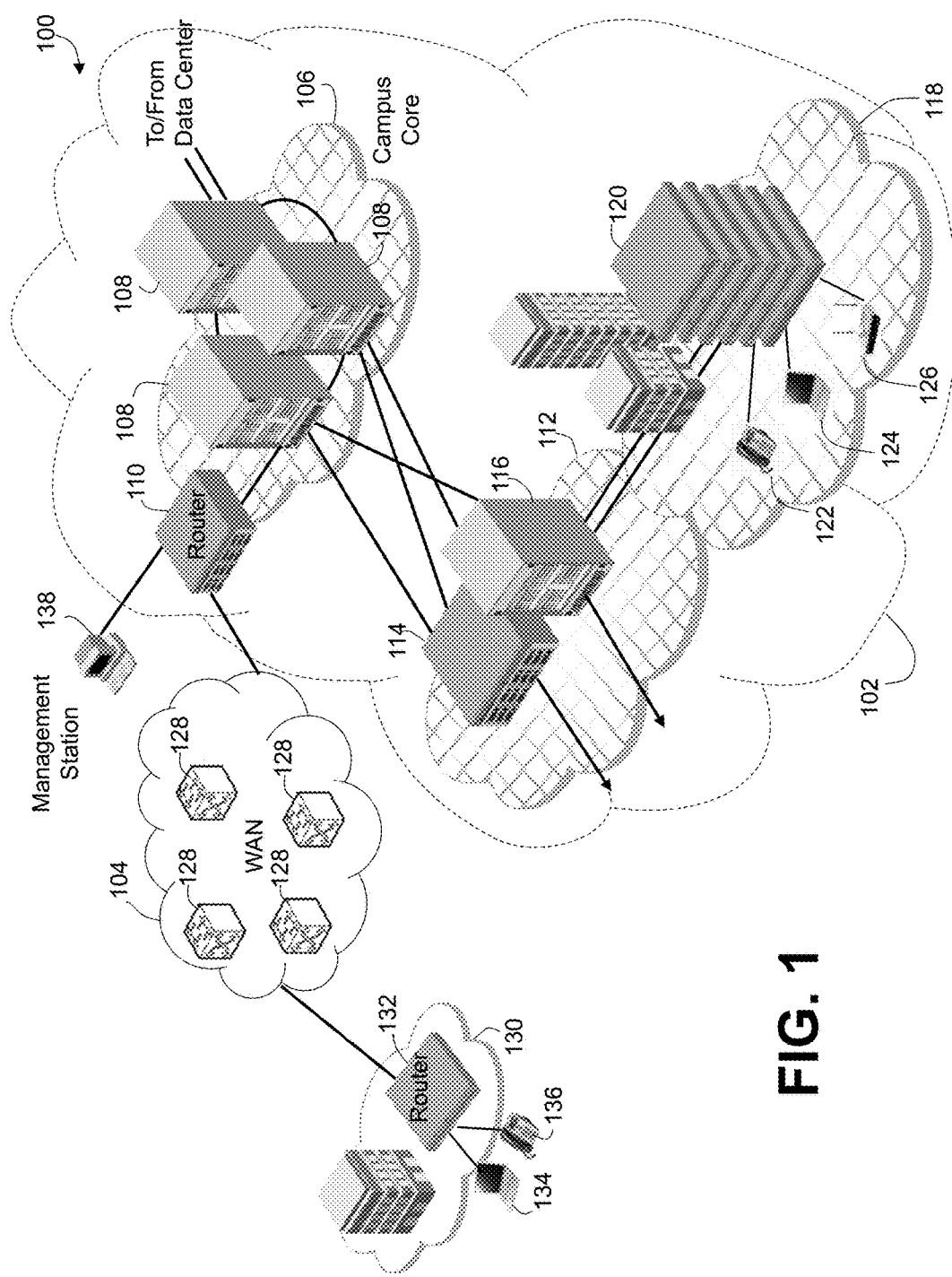
FIG. 1 is a diagram illustrating a local area network (LAN) and wide area network (WAN) as may be incorporated together with one embodiment of the present invention.

Referring to FIG. 1, an Ethernet network 100 is shown wherein a LAN 102 is interconnected to a remote campus 130 via WAN 104. The campus core 106 includes a plurality of interconnected core switches 108. The core switches 108 are connected to a data center (not shown). A router 110 is connected to the core switches and the WAN 104. The core switches 108 are connected to switches 114 and 116 of an aggregation campus 112. The aggregation campus switches 114 and 116 are connected to switches 120 of large network 118 and provide data communication services to the large network's telephone 122, computer 124, and wireless access 126 devices. The aggregation network switches 114 and 116 may also be connected to additional campuses (not shown) in order to provide additional data communication services. The LAN 102 is connected to the WAN 104 via router 110. The WAN 104 is comprised of a plurality of interconnected Ethernet switches 128 and other networking devices (not shown). WAN 104 is connected to remote campus 130 via a router 132. Router 132 provides data communication services to computers 134 and telephone devices 136. Each of the switches in the Ethernet network 100 may have one or more virtual machines (VMs) (not shown). Each switch may also be a large modular chassis Ethernet switch or an Ethernet switch-stack, such as an L2/L3 fixed chassis router-switch stack. It is understood that this is an exemplary network and numerous other network topologies can be monitored according to the present invention.

In an embodiment of the present invention, a management station 138 is connected to router 110 of the campus core 106. As will be appreciated by one having ordinary skill in the art, the management station 138 allows a network administrator to monitor the data traffic, port utilization, and various other networking characteristics of each switching device or VM in the Ethernet network 100. The management station 138 may include a VM manager for managing the VMs. The VM manager may be able to access hypervisors in each server and thus control the VMs.

Figure 2:
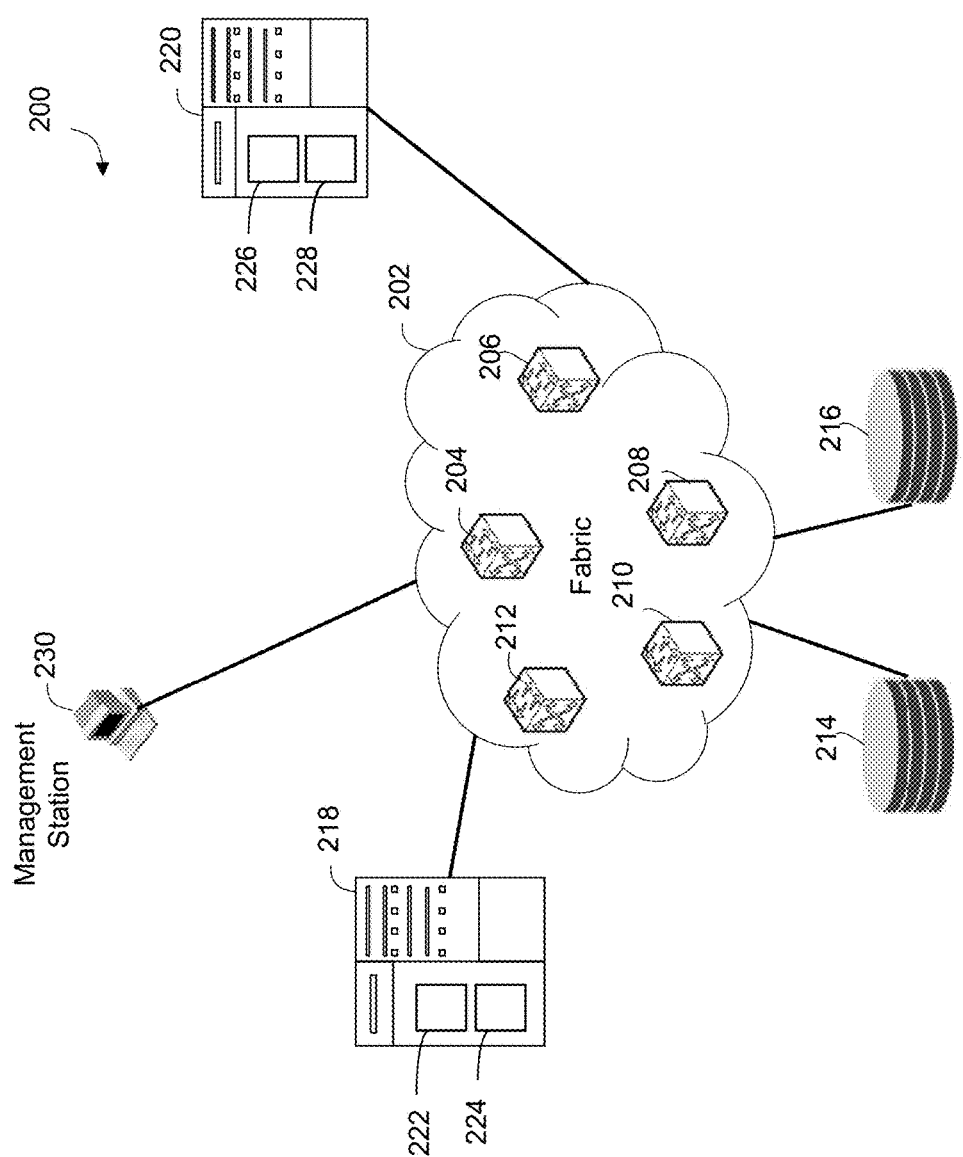
FIG. 2 is a diagram illustrating a Fibre Channel (FC) storage area network (SAN) fabric in accordance with one embodiment of the present invention.

FIG. 2 illustrates a network 200 utilizing the Fibre Channel (FC) protocol. As shown, an FC fabric 202 comprised of a plurality of FC switches 204-212. It should be noted that the network 200 can include one or more additional fabrics that may be interconnected via a WAN, and may also include Ethernet fabrics. The fabric 202 is connected to two storage devices 214 and 216 and connects these storage devices to servers 218 and 220. Each of the servers includes multiple VMs. As shown server 218 includes VMs 222 and 224 and server 220 includes VMs 226 and 228. As above, this is an exemplary network architecture and numerous other FC architectures can be managed according to the present invention.

In one embodiment of the present invention, a management station 230 is connected to fabric 202. Through the fabric 202, the management station 23o can provide network management for the switches 204-212 and monitor the VMs located in each of the servers 218 and 220. As will be appreciated by one having ordinary skill in the art, the management station 230 allows a network administrator to monitor the data traffic, port utilization, and various other networking characteristics using network management software, such that any data congestion may be alleviated.

Figure 3:
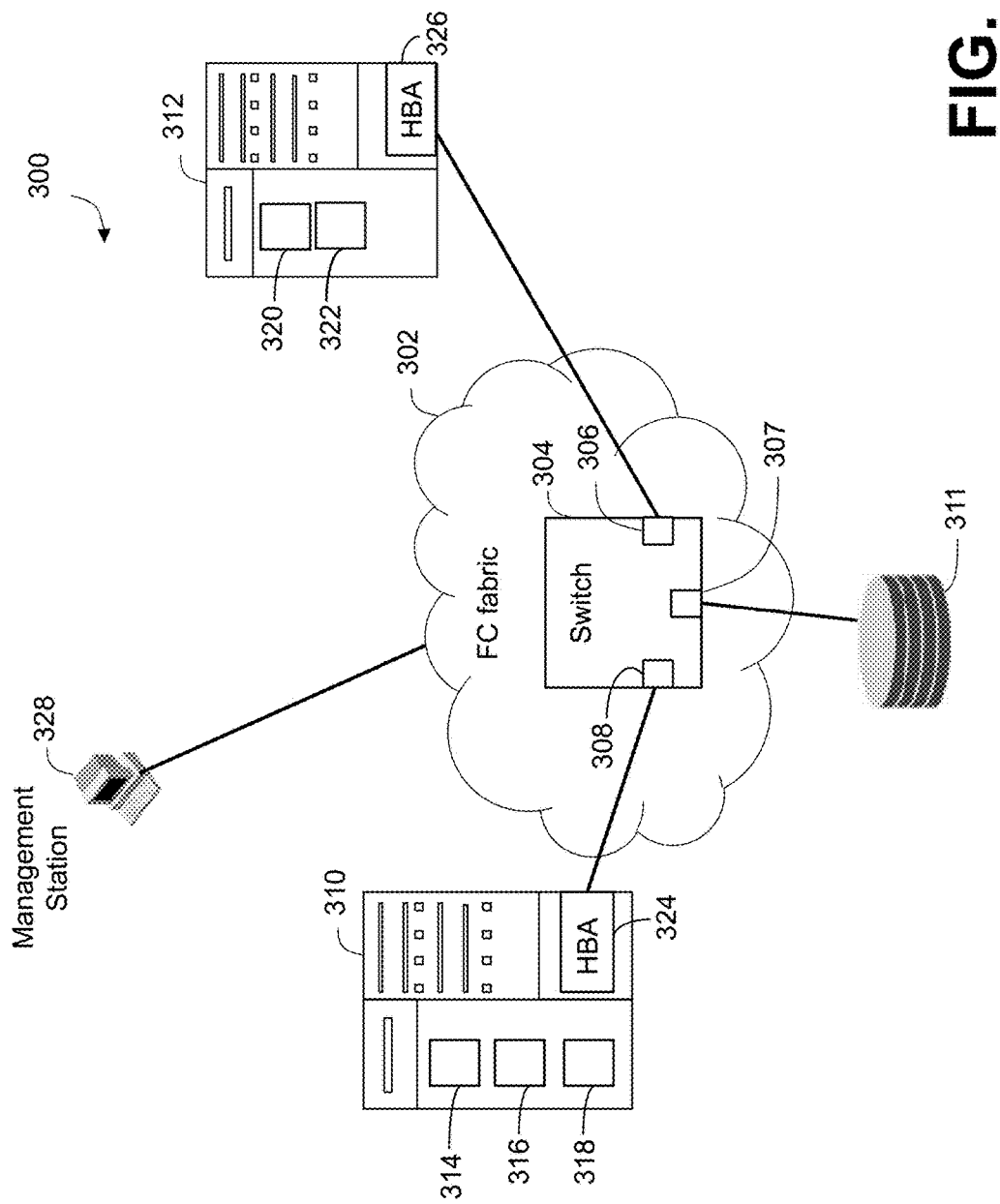
FIG. 3 is a diagram of an FC SAN to illustrate operation in accordance with one embodiment the present invention.

FIG. 3 illustrates a simplified network 300 to illustrate the functions provided by one embodiment of the present invention. As shown, a switch 304, having three ports 306, 307 and 308, is connected through an FC fabric 302 to two hosts 310 and 312. Host 310 includes three VMs 314, 316 and 318 and host 312 includes two VMs 320 and 322. Host 310 is connected to port 308 of the switch 304 through host bus adapter (HBA) 324, and host 312 is connected to port 306 of the switch 304 through the HBA 326. A storage device 311 is connected to port 307 of the switch 304. A management station 328 is also connected to the FC fabric 302 to provide network management for the switch 304. As above, this is an exemplary network architecture and numerous other FC architectures can be managed according to the present invention.

In general, network management systems monitor the various constructs and parameters, particularly flow parameters, by tracking each port. Thus, the management station 328 monitors traffic flow through the switch 302 by tracking each port 308, 307 and 306. In such a system, if a VM or device connected to a port being tracked moves to a different switch port, those parameters would no longer be properly monitored for that device. Thus, for example if VM 314 was to move from host 310 to host 312, the VM would no longer be properly monitored. In the preferred embodiment each VM, or its virtual HBA, has a worldwide name (WWN). Depending on the embodiment, an FC address is associated with that WWN. In one embodiment, the WWN is associated with the HBA FC address, as only one address has been obtained for the HBA. In another embodiment the WWN is associated with an address based on the HBA address by way of N Port identifier virtualization (NPIV) operations. When the VM is moved to a different server, its WWN preferably remains the same but its associated FC address will change because it is working with a different HBA. As parameter monitoring, particularly flow monitoring, is done based on the address, when the VM moves to a different server the measured values will change greatly. If the address is that of the VM itself, not just the HBA, then the values will actually go to zero as the address is no longer present. If the address is associated with the HBA itself, then the values will change as the VM's component is no longer present. In either case proper parameters are no longer being obtained.

In today's network environments, devices and VMs are often migrated to improve efficiency. Because each time a device migrates, parameters relating to that device could no longer be monitored, in prior art network management systems, a network administer would need to identify the switch port to which the device migrated and set up desired parameters to be monitored at the new port. Given the number of migrations in a large network, particularly if the migrations occur automatically without administrator input, this is a time consuming and inefficient task particularly since network administrators have to spend a considerable amount of time on setting the parameters they desired to monitor for each device.

To resolve this issue, a network management system according to the present invention, in one embodiment, is disclosed that periodically compares the WWNs it monitors with the FC address map from a switch. In this manner, when a WWN does not match with the FC address map, the management system identifies the VM as having moved and analyzes the FC address map to locate the VM. Thus when the device moves to a new port, the management system can identify the new location and continue monitoring the same parameters.

In order to provide seamless monitoring of devices during their migration, the system also analyzes currently developed flows to determine which specific traffic routes and parameters between specific hosts and targets are currently being monitored and intelligently map those flows onto the new location, once a migration occurs.

Figure 4:
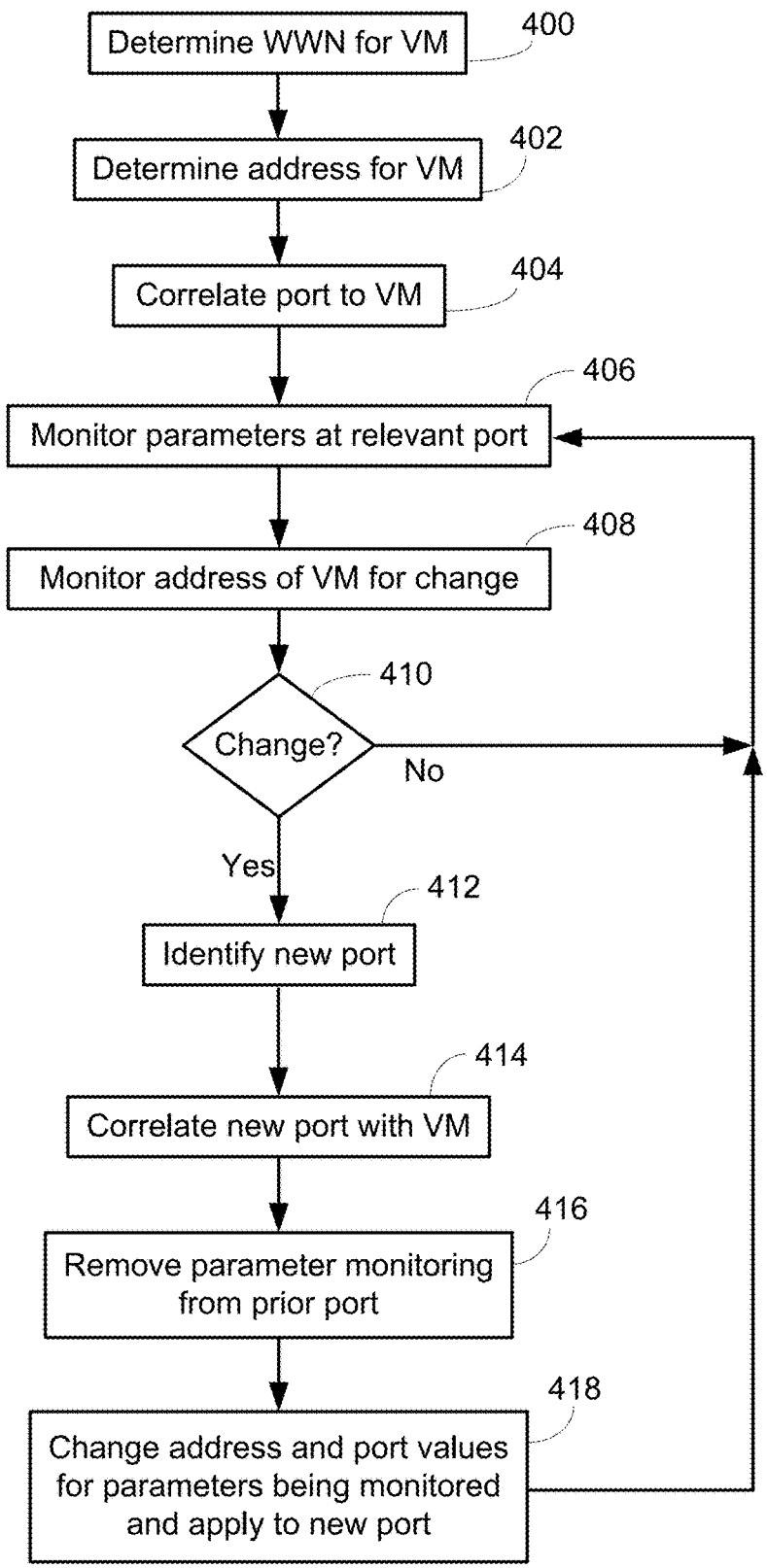
FIG. 4 is a flowchart of the operation of a network management system according to one embodiment of the present invention.

FIG. 4 is a flowchart of the operation of the network management system or software, in one embodiment for continuous monitoring of constructs and data when a device moves in the network. The network management system determines a unique identifier, such as a WWN for an FC device or MAC for an Ethernet device, for each of the various switch ports that need to be monitored at step 400. The management system then determines the address of the VM, such as by querying the switch name server in step 402. The management system then correlates the VM to the port, such as switch 304 port 308 in step 404. The management system then monitors specific constructs and parameters set up by an administrator for the desired devices through the HBAs and ports to which they are connected, at step 406. However, in addition to monitoring constructs and parameters for specific devices, the management system also periodically monitors the WWN associated with the VM and compares to the current FC address map from a switch to see if the VM still has the same address or if there has been a change, at step 408. If a change is identified at step 410, then the management system analyzes the FC address map to locate the VM and identify the new switch port through which the device is connected to the switch, at step 412, and then correlates the new switch port with the VM, at step 414. For example, if the VM 314 has moved to server 312, the VM 314 is now correlated with switch 304 port 306, rather than port 308. In this manner, once a device migrates to a new location, the system automatically detects the new switch port to which it migrated. In step 416 the management system removes the monitoring from the prior port to free up monitoring resources. In step 418 the management system places the new VM address and associated switch port values into the parameters and applies those parameters to the new port. Thus the desired parameters are now being measured at the switch port to which the VM is now connected in step 406.

It is understood that this direct attached example is very simple and involves only minimal monitoring locations. In a more common example the monitoring would be set at each switch port through which a given flow from the VM to the storage device passes. Therefore monitoring could be removed from numerous switches, just altered at various switches to accommodate the new VM address, or added to entirely new switches, depending on change of the flow routing.

Similar methods may be used in an Ethernet network to identify when a device or VM has migrated, determine the new location and make sure the same parameters are monitored at the new location. In an Ethernet network, a VM may be monitored through its MAC address which may also be associated with the MAC address of the port through which it connects to the network. To determine changes, the network management system may periodically poll all switches to find out where a MAC is connected or can have the switches and routers monitor for pings when the VM is activated at the destination and forward that information. In an IP environment, once the MAC has been determined to be moved, the connecting switch's address resolution protocol (ARP) table can be reviewed. This is different from the method used in an FC environment, where because the name server contains the desired information and is distributed, monitoring any one switch may be enough. The polling is done, in one embodiment, through the use of command line interface (CLI) commands known in the art. Other methods for determining attachment location of a given MAC address are also well known for use with Ethernet switches and polling is just a simple example.

Figure 5:
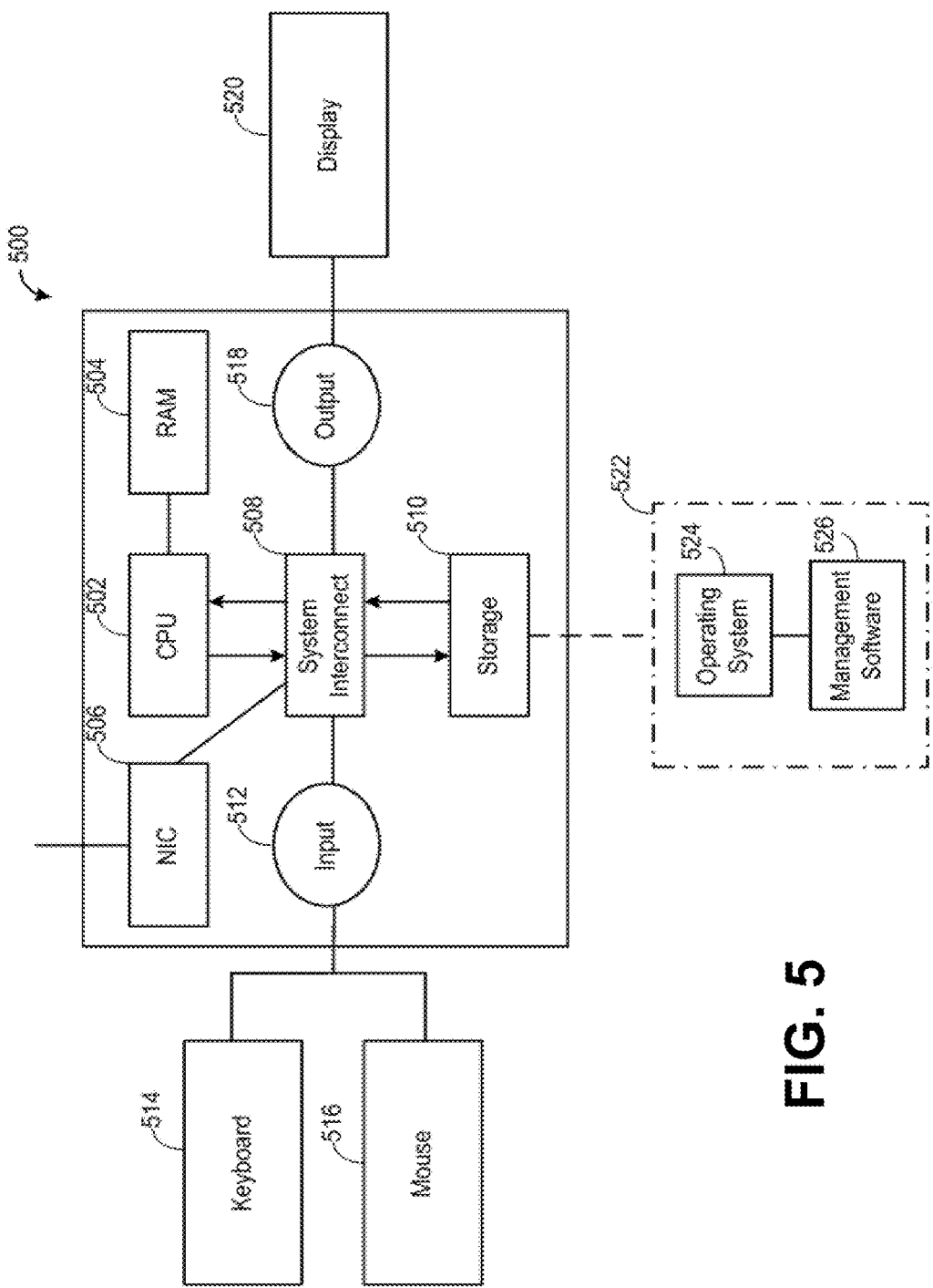
FIG. 5 is a block diagram of a management station for operating in accordance with the present invention.

FIG. 5 illustrates a block diagram of a management station 500, similar to management stations 138, 230 and 338, that may be utilized in accordance with the present invention. As shown, the management station 500 is comprised of a central processing unit (CPU) 502, random access memory (RAM) 504, network interface card (NIC) 506, system interconnect 508, storage component 510, input component 512, and output component 518 which are all interconnected via the system interconnect 508. The input component 512 may be connected to an input device such as a keyboard 514 and mouse 516. The output component 518 is connected to a display device 520, such as an LCD monitor. Storage component 510 stores software 522, which typically includes an operating system 524 and network management software 526. The NIC 506 allows the management station 500 to communicate with a network. As understood by those skilled in the art, network management software is typically designed to allow a network administrator to quickly and efficiently monitor and manage a large network via a user interface, often a graphical user interface (GUI). The network management software 526 could be, for example, Brocade Network Advisor by Brocade Communication Systems, Inc. Once booted, the management station 500 loads the operating system 524 from the storage 510 into the RAM 504. From the operating system 524 a user may run the network management software 526, which is then also loaded into the RAM 504. The interface of the network management software 526 is then displayed on the display 520 via the output component 518. The network management software 526 allows a user to monitor numerous parameters or network characteristics, such as the number events on the network, number of unused ports of network devices, memory utilization of network devices, bandwidth utilization of network devices, and CPU utilization of network devices. It is understood that this is an exemplary computer system architecture and numerous other computer architectures can be used according to the present invention.

Figure 6:
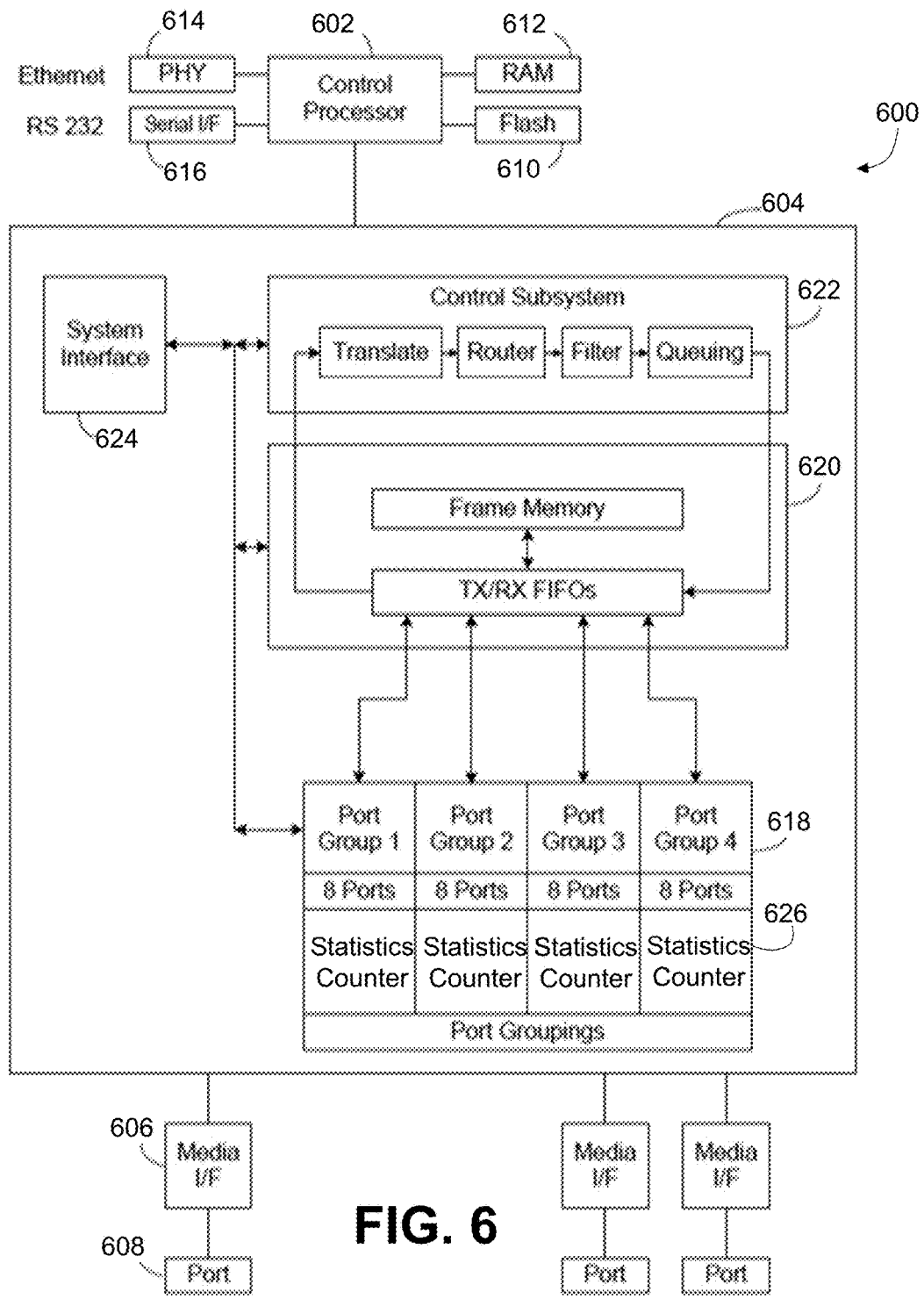
FIG. 6 is a diagram of a Fibre Channel Switch that may be incorporated together with the present invention.

FIG. 6 illustrates a block diagram of a FC switch 600 that may be utilized in accordance with the SAN network 300. A control processor 602 is connected to a switch ASIC 604. The switch ASIC 604 is connected to media interfaces 606 which are connected to ports 608. Generally the control processor 602 configures the switch ASIC 604 and handles higher level switch operations, such as the name server, the redirection requests, and the like. The switch ASIC 604 handles the general high speed inline or in-band operations, such as switching, routing and frame translation. The control processor 602 is connected to flash memory 610 to hold the software, to RAM 612 for working memory and to an Ethernet PHY 614 used for management connection and serial interface 616 for out-of-band management.

The switch ASIC 602 has four basic modules, port groups 618, a frame data storage system 620, a control subsystem 622 and a system interface 624. The port groups 618 perform the lowest level of packet transmission and reception, and include a statistical counter module 626 to allow management software to access the various statistical counters of the switch 600, such as receive and transmit rate counters for each port. Generally, frames are received from a media interface 606 and provided to the frame data storage system 620. Further, frames are received from the frame data storage system 620 and provided to the media interface 606 for transmission out a port 608.

While the present embodiment discusses communication networks using the Ethernet and FC protocols, with switches, routers and the like, the present invention can be applied to any type of data communication network.

Figure 7:
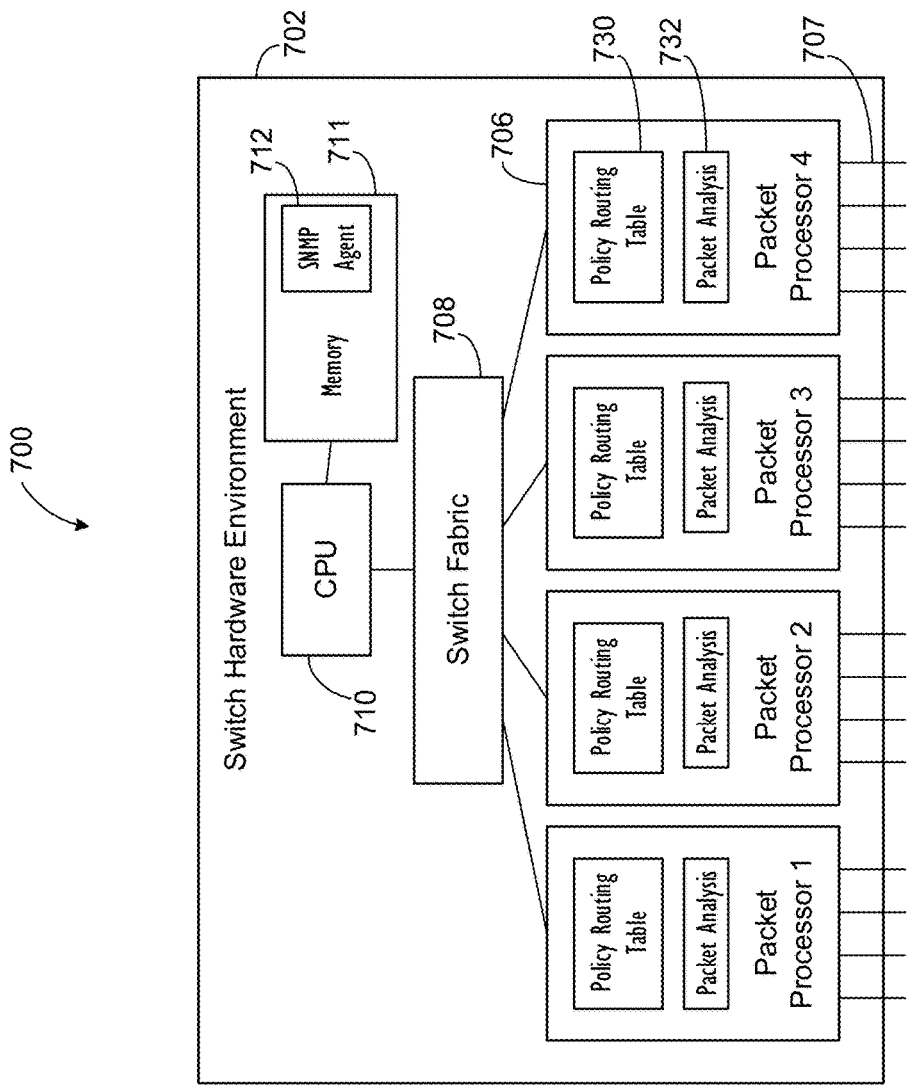
FIG. 7 is a block diagram of an Ethernet switch that may be incorporated together with the present invention.

FIG. 7 illustrates an exemplary switch 700 may be utilized in accordance with the LAN 102. The switch hardware 702 includes a series of packet processors 706 which provide the switch ports 707. Each packet processor 706 includes a policy routing table 730 for routing packets and a packet analysis module 732, which analyzes packet headers and the like for desired information. The packet processors 706 are connected to a switch fabric 708 to allow packet switching. A switch CPU 710 is connected to the switch fabric 708 to allow packets to be forwarded from the packet processors 706 to the switch CPU 710 for further analysis and handling. A memory 711 is connected to the CPU 710 and holds program instructions executed by the CPU 710 to perform the various operations. This is an exemplary switch architecture and many variations and further details are well known to those skilled in the art. Given the above description one skilled in the art can modify those variations to provide similar functionality to that described herein. In some of the variations certain operations described as being done by the CPU To may be done in hardware, such as developing the response tracepath packets, if the hardware is sufficiently advanced to provide hardware modules to perform the operations.

Figure 8:
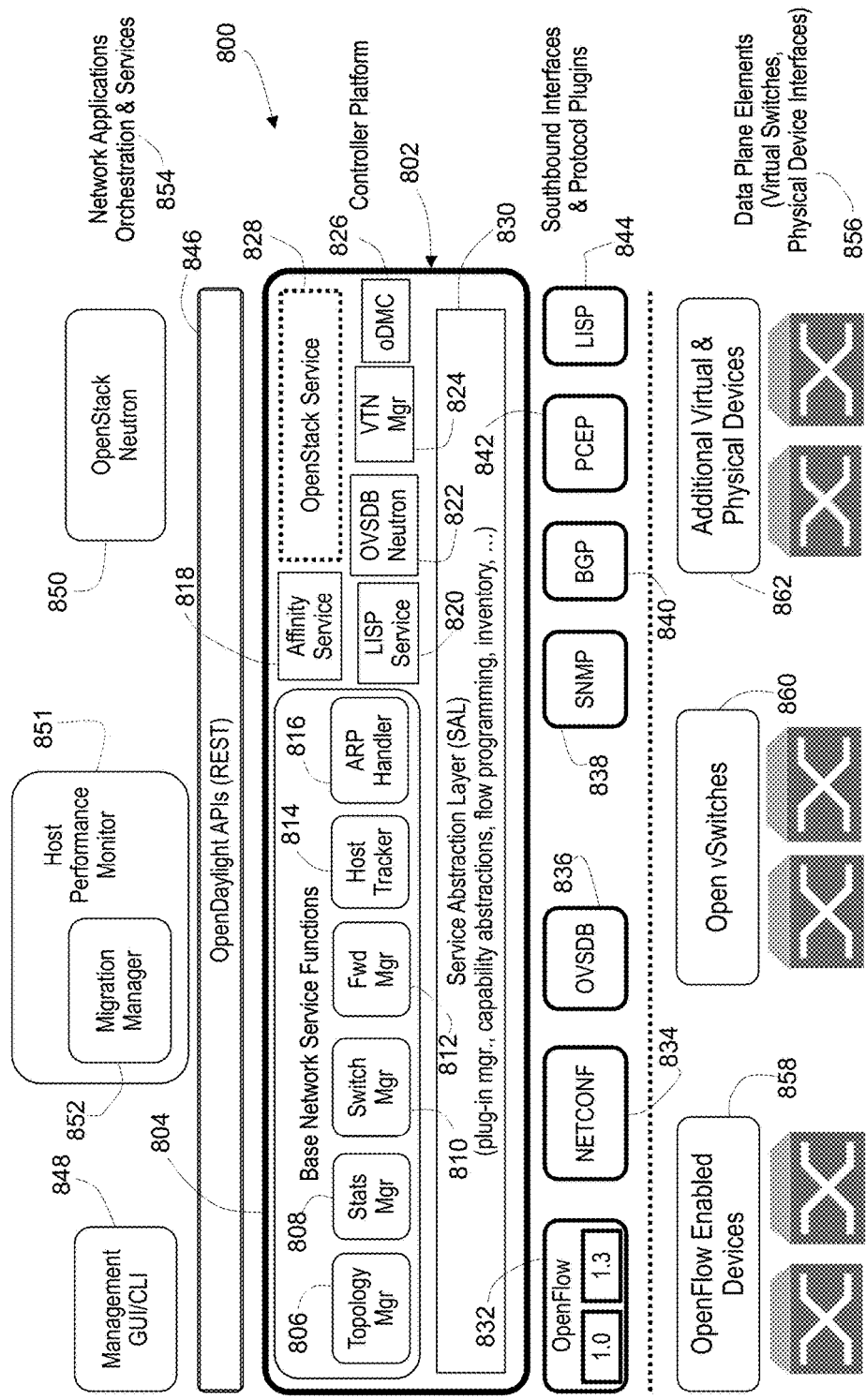
FIG. 8 is a block diagram of a software defined networking controller may be incorporated together with the present invention.

FIG. 8 is an alternate embodiment for use in a software defined networking (SDN) environment. FIG. 8 is a block diagram of a network 800 based around the OpenDaylight™ controller 802 of the OpenDaylight Project, Inc. The controller 802 performs most of the management and routing functions normally performed in a switch or router but allows both more sophisticated or flexible management and customized routing and also allows the integration of various network services as applications. A base network service functions module 804 includes a topology manager module 806, a statistics manager module 808, a switch manager module 810, a forwarding manager module 812, a host racking module 814, and an ARP handler module 816. The host tracker module 814 is of most interest as its function is to track the attachment point (switch, port, VLAN) of IP hosts in the network. When the host tracker module 816 learns a host for the first time it adds the host information (Host's IP address, MAC address, switch ID, port, and VLAN) to the local database and notifies interested applications of its appearance. Similarly, the host tracker module 816 notifies them when an existing host is removed from the network either due to switch/port down event or due to ARP Aging. The host tracker module 816 frequently refreshes the hosts' information in the database. E.g. when a host has been moved from one location (switch, port, MAC, or VLAN) to another, the host tracker module 816 replaces the existing host and its previous location parameters with new information, and notifies the applications listening to host move.

The controller platform 802 further includes an affinity service module 818 used to allow controller and higher-level applications to create and share an abstract, topology and implementation independent description of the infrastructure needs, preferences and behaviors of workloads that use the network to "talk" to one another. A Locator ID Separation Protocol (LISP) service module 820 provides a flexible map-and-encap framework that can be used for overlay network applications, such as data center network virtualization, and Network Function Virtualization (NFV). An Open vSwitch Data Base OVSDB) Protocol module 822 implement the Open vSwitch Database management protocol, allowing southbound configuration of vSwitches. A virtual tenant network (VTN) manager module 824 provides multi-tenant virtual network. An open DOVE management console module 826 cooperates with open DOVE components in the network to manage the open DOVE environment. Open DOVE is an overlay network virtualization platform for the data center. An OpenStack service module 828 cooperates in an OpenStack environment to manage the networking portion of the OpenStack environment. OpenStack is a free and open-source software cloud computing software platform.

The final portion of the controller 802 is the service abstraction layer (SAL) 830. The SAL 830 allows support of multiple protocols and plugins on the southbound interface and provides consistent services for modules and network applications. Those protocols and plugins include an OpenFlow plugin 832, a Network Configuration Protocol (NETCONF) plugin 834, an OVSDB plugin 836, an Simple Network Management Protocol (SNMP) module 838, a border gateway protocol (BGP) module 840, a Path Computation Element Communication Protocol (PCEP) module 842, and a LISP module 844. A series of northbound application programming interfaces (APIs) 846 conform to Representational state transfer (REST) and are used to provide the interface to the applications 854 operating with the controller 802. One application is a management GUI/CLI application 848 to allow management of the controller 802 and the various modules. Another typical application would be an OpenStack application 850 to provide OpenStack capability to the network.

Of interest according to the present invention is a migration manger module 852 to perform the functions previously described for the management station. The migration manager module 852 is preferably a module in a more comprehensive host performance monitor application 851. The host performance monitor application 851 provides the performance monitoring tasks and reporting previously performed in the management workstation. The migration manager module 852 is coupled to the host tracker module 814 to monitor for movement of VMs and to the statistics manager module 808 to control the monitoring of network parameters. By operating the migration management functions according to the present invention as a module in an application on the OpenDaylight controller 802 or similar SDN controller, particularly when the performance monitoring is done as an application in the controller.

A series of data plane elements 856 are coupled to the southbound interfaces and plugins. These elements 856 include OpenFlow enabled devices 858, Open vSwitches 860 and other virtual and physical devices 862.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the frill scope of equivalents to which such claims are entitled. In the appended claims, the terms "including" and "in which" are used as the plain-English equivalents of the respective terms "comprising" and "wherein."

The invention claimed is:

1. A method comprising:
   determining a first distinct element identifier for a virtual network element in a data communication network, the virtual network element being coupled through a first port of a first switch;
   querying, using the first distinct element identifier, at least one network device to obtain a second distinct element identifier for the virtual network element:
   correlating the second distinct element identifier with the first port;
   configuring the first switch to perform monitoring of at least one network performance parameter value of the virtual network element at the first port;
   querying, using the first distinct element identifier, the at least one network device to obtain a current mapping between the first distinct element identifier and a current second distinct element identifier;
   monitoring, based on the query to obtain the current mapping, the first distinct element identifier to determine a change in the second distinct element identifier after completing a move of the virtual network element within the data communication network;
   identifying a second port of a second switch through which the virtual network element is coupled based on the changed second distinct element identifier;
   correlating the changed second distinct element identifier with the second port; and
   configuring the second switch to perform monitoring of the at least one network performance parameter value of the virtual network element at the second port based on the correlation of the changed second distinct element identifier with the second port.

2. The method of claim 1, wherein the second distinct element identifier for the virtual network element is an address of the virtual network element.

3. The method of claim 1, wherein the second distinct element identifier is a worldwide name (WWN) of the virtual network element.

4. The method of claim 1, wherein monitoring, based on querying to obtain the current mapping, the first distinct element identifier to determine the change in the second distinct element identifier comprises:
   storing a first mapping of the first distinct element identifier to the second distinct element identifier;
   comparing, using the first mapping and the current mapping, the second distinct element identifier to the current second distinct element identifier; and
   determining the change in the second distinct element identifier based on the comparison that the second distinct element identifier differs from the current second distinct element identifier.

5. A non-transitory computer readable storage medium or media having computer-executable instructions stored therein for an application which performs the following method, the method comprising:

determining a first distinct element identifier for a virtual network element in a data communication network, the virtual network element being coupled through a first port of a first switch;

querying, with the first distinct element identifier, at least one network device to obtain a second distinct element identifier for the virtual network element;

correlating the second distinct element identifier with the first port;

configuring the first switch to perform monitoring of at least one network performance parameter value of the virtual network element at the first port;

querying, with the first distinct element identifier, the at least one network device to obtain a current mapping between the first distinct element identifier and a current second distinct element identifier monitoring, based on the query to obtain the current mapping, the first distinct element identifier to determine a change in the second distinct element identifier that is indicative of completing a move of the virtual network element within the data communication network;

identifying a second port of a second switch through which the virtual network element is coupled based on the changed second distinct element identifier;

correlating the changed second distinct element identifier with the second port; and configuring the second switch to perform monitoring of the at least one network performance parameter value of the virtual network element at the second port based on the correlation of the changed second distinct element identifier with the second port.

6. The non-transitory computer readable storage medium or media of claim 5, wherein the second distinct element identifier for the virtual network element is an address of the virtual network element.

7. The non-transitory computer readable storage medium or media of claim 5,
wherein the second distinct element identifier is a worldwide name (WWN) of the virtual network element.

8. A computer system comprising:
a processor;
storage coupled to said processor and storing computer-executable instructions for an application which cause said processor to perform the following:
determining a first distinct element identifier for a virtual network element in a data communication network, the virtual network element being coupled through a first port of a first switch;
querying, based on the first distinct element identifier, at least one network device to obtain a second distinct element identifier for the virtual network element;
correlating the second distinct element identifier with the first port;
configuring the first switch to perform monitoring of at least one network performance parameter value of the virtual network element at the first port;
querying, based on the first distinct element identifier, the at least one network device to obtain a current mapping between the first distinct element identifier and a current second distinct element identifier;
monitoring, based on the query to obtain the current mapping, the first distinct element identifier to determine a change in the second distinct element identifier that occurs after completing a move of the virtual network element within the data communication network;
identifying a second port of a second switch through which the virtual network element is coupled based on the changed second distinct element identifier;
correlating the changed second distinct element identifier with the second port; and
configuring the second switch to perform monitoring of the at least one network performance parameter value of the virtual network element at the second port based on the correlation of the changed second distinct element identifier with the second port.

9. The system of claim 8, wherein the second distinct element identifier for the virtual network element is an address of the virtual network element.

10. The system of claim 8,
wherein the second distinct element identifier is a worldwide name (WWN) of the virtual network element.

11. The system of claim 8, wherein the computer-executable instructions for monitoring the first distinct element identifier to determine the change in the second distinct element identifier further comprises computer-executable instructions that further cause said processor to perform the following:
storing a first mapping of the first distinct element identifier to the second distinct element identifier;
comparing, based on the first mapping and the current mapping, the second distinct element identifier to the current second distinct element identifier; and
determining the change in the second distinct element identifier based on the comparison that the second distinct element identifier differs from current second distinct element identifier.

12. The method of claim 1, wherein monitoring of the virtual network element at the first port corresponds to a time period of when the virtual network element is operational at the first port, and wherein monitoring of the virtual network element at the second port corresponds to a second time period the virtual network element is operational at the second port.

13. The method of claim 1, further comprising the step of configuring the first switch to stop monitoring the at least one network performance parameter value of the virtual network element at the first port after completing the move of the virtual network element within the data communication network.

14. The non-transitory computer readable storage medium or media of claim 5, wherein monitoring of the virtual network element at the first port corresponds to a time period of when the virtual network element is operational at the first port, and wherein monitoring of the virtual network element at the second port corresponds to a second time period the virtual network element is operational at the second port.

15. The non-transitory computer readable storage medium or media of claim 5, wherein monitoring the first distinct element identifier to determine the change in the second distinct element identifier comprises:
storing a first mapping of the first distinct element identifier to the second distinct element identifier;
comparing, based on the first mapping and the current mapping, the second distinct element identifier to the current second distinct element identifier; and
determining the change in the second distinct element identifier based on the comparison that the second distinct element identifier differs from the current second distinct element identifier.

16. The non-transitory computer readable storage medium or media of claim 5, the method further comprising the step of configuring the first switch to stop monitoring the at least one network performance parameter value of the virtual network element at the first port after completing the move of the virtual network element within the data communication network.

17. The system of claim 8, wherein monitoring of the virtual network element at the first port corresponds to a time period of when the virtual network element is operational at the first port, and wherein monitoring of the virtual network element at the second port corresponds to a second time period the virtual network element is operational at the second port.

18. The system of claim 8, wherein the computer-executable instructions further cause said processor to perform the following: configuring the first switch to stop monitoring the at least one network performance parameter value of the virtual network element at the first port after completing the move of the virtual network element within the data communication network.

19. The method of claim 1, wherein configuring the second switch to perform monitoring of the at least one network performance parameter value comprises:
   automatically updating a first parameter of the monitoring of the at least one network performance parameter value with the changed second distinct element identifier in place of the second distinct element identifier;
   automatically updating a second parameter of the monitoring of the at least one network performance parameter value with an identifier of the second port in place of an identifier of the first port; and
   applying the updated first and second parameters to the second port to allow for monitoring of the at least one network performance parameter value of the virtual network element.

20. The system of claim 8, wherein the computer-executable instructions for configuring the second switch to perform monitoring of the at least one network performance parameter value further comprises computer-executable instructions that further cause said processor to perform the following:
   automatically updating a first parameter of the monitoring of the at least one network performance parameter value with the changed second distinct element identifier in place of the second distinct element identifier;
   automatically updating a second parameter of the monitoring of the at least one network performance parameter value with an identifier of the second port in place of an identifier of the first port; and
   applying the updated first and second parameters to the second port to allow for monitoring of the at least one network performance parameter value of the virtual network element.

* * * * *